United States Patent
Srinivasan et al.

(10) Patent No.: US 11,816,937 B2
(45) Date of Patent: Nov. 14, 2023

(54) SYSTEMS AND METHODS FOR RECONFIGURABLE ON-VEHICLE DATA ROUTING

(71) Applicant: Honeywell International Inc., Charlotte, NC (US)

(72) Inventors: Divya Swarup Giriyappa Srinivasan, Bangalore (IN); Thomas D. Judd, Woodinville, WA (US)

(73) Assignee: Honeywell International Inc., Charlotte, NC (US)

( * ) Notice: Subject to any disclaimer, the term of this patent is extended or adjusted under 35 U.S.C. 154(b) by 423 days.

(21) Appl. No.: 17/150,479

(22) Filed: Jan. 15, 2021

(65) Prior Publication Data

US 2022/0157089 A1 May 19, 2022

(30) Foreign Application Priority Data

Nov. 18, 2020 (IN) .............................. 202011050163

(51) Int. Cl.
*G07C 5/00* (2006.01)
*G06F 16/9035* (2019.01)
*H04L 12/40* (2006.01)

(52) U.S. Cl.
CPC ......... *G07C 5/008* (2013.01); *G06F 16/9035* (2019.01); *H04L 12/40* (2013.01);
(Continued)

(58) Field of Classification Search
CPC ..... G07C 5/008; G06F 16/9035; H04L 12/40; H04L 2012/40273; H04L 2012/4028;
(Continued)

(56) References Cited

U.S. PATENT DOCUMENTS 7,940,791 B2   5/2011   Farricker et al.
8,019,338 B2   9/2011   Malaga et al.
(Continued)

FOREIGN PATENT DOCUMENTS

EP   2040392 A2 *   3/2009   ......... H04B 7/18506
EP   3288007 A1 *   2/2018   ........... G08G 5/0026
(Continued)

OTHER PUBLICATIONS

WO 2009/047297 A2 with English Translation (Year: 2009).*
(Continued)

*Primary Examiner* — Calvin Cheung
(74) *Attorney, Agent, or Firm* — Fogg & Powers LC (57) ABSTRACT

Systems and methods for reconfigurable on-vehicle data routing are provided. In one embodiment, a data link communication system comprises: a router to communicate with at least one communication bus and at least one data bus, and monitor data communicated over the communication data buses, wherein the communication bus communicates data link messages with an off-vehicle service provider system, wherein the data bus transports data between the router and a plurality of on-vehicle systems; a routing control logic; and a conditional logic database, wherein the database comprises definitions of one or more datatypes and definitions for at least one data forwarding command; wherein, in response to receiving a first set of data associated with a datatype defined by the database, the logic executes the at least one data forwarding command to control the router to output a second set of data to one or more of the plurality of on-vehicle systems.

16 Claims, 6 Drawing Sheets

(52) U.S. Cl.
CPC ............... *H04L 2012/4028* (2013.01); *H04L 2012/40273* (2013.01); *H04L 2012/40286* (2013.01); *H04L 2012/40293* (2013.01)

(58) Field of Classification Search
CPC . H04L 2012/40286; H04L 2012/40293; H04L 12/66; H04L 45/02; H04L 67/12; H04L 2012/40267; H04L 12/46
See application file for complete search history.

(56) References Cited

U.S. PATENT DOCUMENTS

| | | | |
|---|---|---|---|
| 8,121,593 B2 | 2/2012 | Pandit et al. | |
| 8,427,343 B2 | 4/2013 | McGuffin et al. | |
| 9,280,903 B2* | 3/2016 | Judy | G08G 5/0013 |
| 9,694,903 B2 | 7/2017 | Beltrand | |
| 9,954,967 B1 | 4/2018 | Gheorghe et al. | |
| 10,023,324 B2 | 7/2018 | Jayathirtha et al. | |
| 10,382,557 B2 | 8/2019 | Watson et al. | |
| 10,664,258 B2 | 5/2020 | Srinivasan et al. | |
| 10,666,764 B2 | 5/2020 | Judd et al. | |
| 2005/0286452 A1* | 12/2005 | Hardgrave | H04L 69/18 |
| | | | 370/310 |
| 2009/0117895 A1* | 5/2009 | McGuffin | H04L 47/10 |
| | | | 455/431 |
| 2009/0259612 A1* | 10/2009 | Hanson | H04L 69/22 |
| | | | 706/47 |
| 2010/0241345 A1* | 9/2010 | Cornell | G08G 5/003 |
| | | | 701/120 |
| 2011/0176617 A1 | 7/2011 | Fagan et al. | |
| 2011/0255506 A1 | 10/2011 | Toth et al. | |
| 2012/0105637 A1 | 5/2012 | Yousefi et al. | |
| 2016/0125744 A1* | 5/2016 | Shamasundar | G08G 5/0091 |
| | | | 701/122 |
| 2016/0176538 A1* | 6/2016 | Bekanich | G08G 5/0021 |
| | | | 701/14 |
| 2017/0019479 A1 | 1/2017 | Rangarajan et al. | |
| 2018/0315323 A1* | 11/2018 | Winkler | G08G 5/0095 |
| 2018/0337720 A1* | 11/2018 | He | H04B 1/38 |
| 2018/0359670 A1* | 12/2018 | Fang | H04W 36/08 |
| 2020/0145829 A1 | 5/2020 | Rule | |

FOREIGN PATENT DOCUMENTS

| | | | |
|---|---|---|---|
| EP | 3130117 B1 * | 8/2019 | ......... H04B 7/18506 |
| FR | 2969785 B1 | 4/2013 | |
| WO | WO 92/06436 A2 * | 4/1992 | ............. G06F 15/16 |

OTHER PUBLICATIONS

JP 5571245 B2 with English translation. Filed May 18, 2011. Published Aug. 13, 2014. (Year: 2014).*
"Datalink Aeronautical Operational Control Flight Tracker", at least as early as Aug. 4, 2020, pp. 1 through 2, Honeywell International Inc.
Franceschini, "Wireless Avionics Intra-Communications (WAIC)", Future of Instrumentation & Internet Workshop, May 4, 2015, pp. 1 through 37, AVSI.
European Patent Office, "Communication pursuant to Article 94(3)", from EP Application No. 21208209.3, from Foreign Counterpart to U.S. Appl. No. 17/150,479, dated Mar. 24, 2023, pp. 1 through 6, Published: EP.
European Patent Office, "Extended European Search Report from EP Application No. 21208209.3", from Foreign Counterpart to U.S. Appl. No. 17/150,749, dated Mar. 25, 2022 pp. 1 through 10, Published: EP.

* cited by examiner

SYSTEMS AND METHODS FOR RECONFIGURABLE ON-VEHICLE DATA ROUTING

CROSS-REFERENCE TO RELATED APPLICATIONS

This U.S. patent application claims the benefit of, and priority to, Indian Patent Application Serial No. 202011050163 filed Nov. 18, 2020, titled "SYSTEMS AND METHODS FOR RECONFIGURABLE ON-VEHICLE DATA ROUTING", which is incorporated herein by reference in its entirety.

BACKGROUND

With current aircraft, a link ground service provider may send an Aircraft Communications, Addressing and Reporting System (ACARS) uplink message to the aircraft's data communications system that contains information intended for use by either the flight crew or by one of many on-aircraft systems. Uplink messages may be sent, for example, by an airline or aircraft operations center through air and/or ground datalink subnetworks via Very High Frequency (VHF), Satellite Communications (SATCOM) and/or High Frequency (HF) datalink medias. Such data link communications systems are typically implemented in an aircraft as the Communications Management Unit (CMU), Communications Management Function (CMF) or Air Traffic Services Unit (ATSU) systems. Currently, when the information included in the uplink messages is needed by more than one of the on-aircraft systems, individual uplink messages are be transmitted to each of those on-aircraft systems. This duplication can have negative bandwidth utilization connotations and corresponding negative monetary connotations. Moreover, when an on-vehicle device has received such uplinked information, or any other type of data, it cannot share or otherwise synchronize that data with any other on-vehicle device unless it is specifically programmed to do so.

For the reasons stated above and for other reasons stated below which will become apparent to those skilled in the art upon reading and understanding the specification, there is a need in the art for systems and methods for reconfigurable on-vehicle data routing.

SUMMARY

The Embodiments of the present disclosure provide methods and systems for reconfigurable on-vehicle data routing and will be understood by reading and studying the following specification.

In one embodiment, a data link communication system for a vehicle comprises: a data link communications router configured to communicate with at least one on-vehicle communication bus and at least one on-vehicle data bus, and monitor data communicated over the at least one on-vehicle communication bus and the at least one on-vehicle data bus, wherein the at least one communication bus communicates data link messages with at least one off-vehicle service provider systems, wherein the at least one on-vehicle data bus transports data between the data link communications router and a plurality of on-vehicle systems; a routing control logic; and a conditional logic database coupled to the routing control logic, wherein the conditional logic database comprises definitions which include definitions of one or more datatypes and definitions for at least one data forwarding command utilized by the routing control logic to forward data to the plurality of on-vehicle systems; wherein, in response to the data link communications system receiving a first set of data associated with a datatype defined by the conditional logic database, the routing control logic executes the at least one data forwarding command to control the data link communications router to output a second set of data to one or more of the plurality of on-vehicle systems.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide for on-vehicle data link communication systems and methods with the capability of providing flexible onboard routing logic that can be updated without the need for hardware or software updates. In particular, data base defined data forwarding commands are utilized to dictate to an on-vehicle data link communications system when and how specified types of data received at the data link communications system are to be parsed, processed and/or forwarded to other on-board devices.

Figure 1:
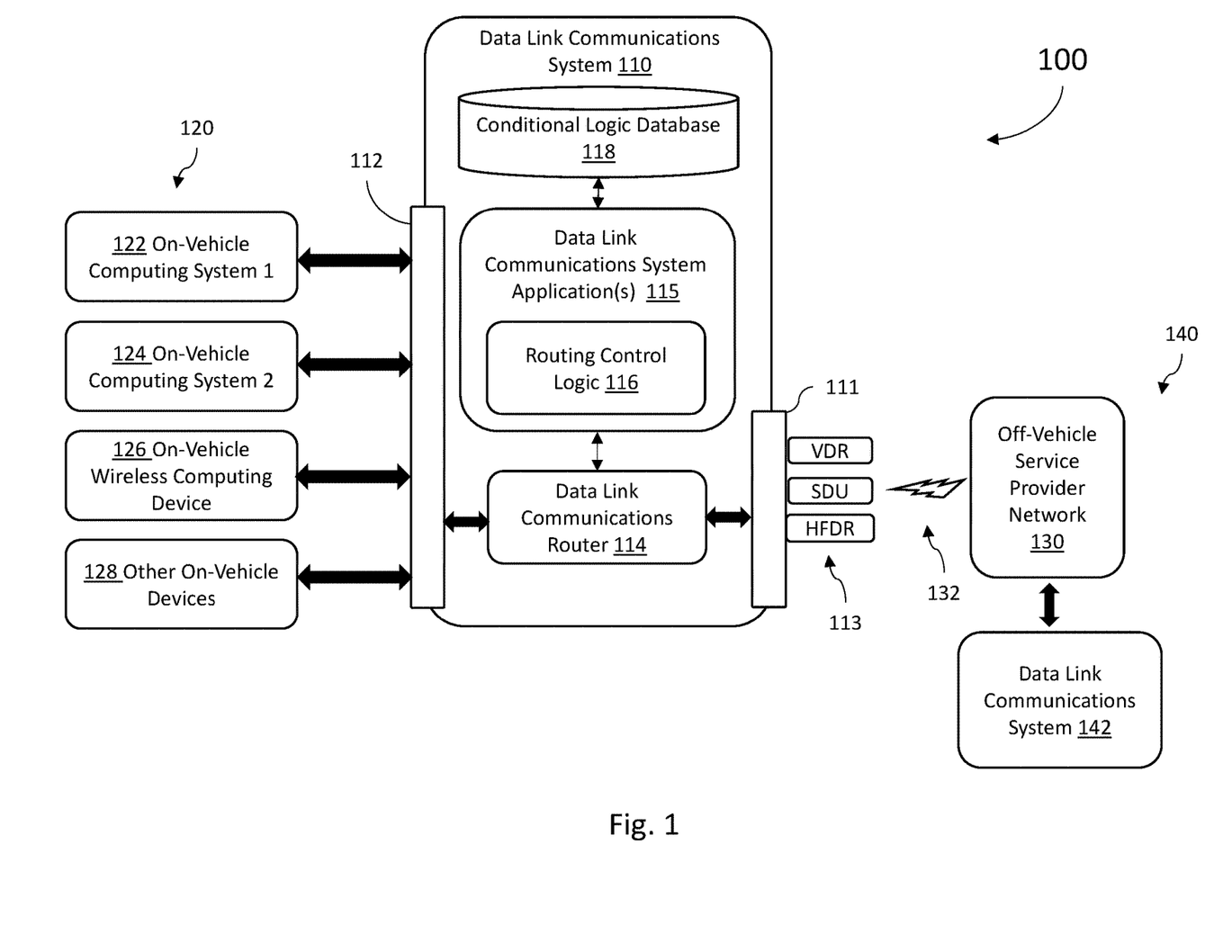
FIG. 1 is a diagram illustrating an example on-vehicle data link communication system 110 embodiment.

FIG. 1 is a diagram illustrating generally at 100 an example on-vehicle data link communication system 110 embodiment. Data link communication system 110 functions as management unit that routes data received from off-vehicle systems (shown generally at 140) to on-vehicle systems 120 (also referred to herein as on-vehicle systems 120), or applications 115 executed on the data link communication system 110 itself. In some embodiments, the data link communication system 110 also routes data generated by the on-vehicle systems or devices 120 and/or applications 115 between themselves, and/or off-vehicle systems 140. In some implementations the data link communication system 110 itself may be one of the on-vehicle systems 120. In contrast to traditional routing where a router receives a message and forwards it to another device based on a destination address in the message, the data link communication system 110 may receive, detect, and utilize, broadcast data (i.e., data transmitted but not addressed to a specific device) and/or uplink messages to determine when, where, and what data should be sent to one or more destinations.

The data link communication system 110 may comprise hardware, circuitry, processors and memory electronic devices which are programmed with code executed to perform the functions of the data link communication system 110 described herein. It should be understood that the term "data" as used herein is intended to be encompassing and may include forms of information such as, but not limited to, messages, communications, sensor or other parameter data, or any other form of information that might be received by the data link communication system 110. As such, the terms "data received" or "data obtained" by the data link communication system 110 further include information generated by the applications 115, clock or timer values, signals generated by any component on the vehicle including event indicators or trigger signals, user (e.g. driver or pilot) inputs into a human machine interface (for example, an Multi-Function Control and Display Unit (MCDU)), push buttons, or other actions such as responses to an uplink message, for example.

Moreover, the data link communication system 110 and on-vehicle systems 120 may be on-board or otherwise integrated into the systems of any form of vehicle, such as but not limited to aircraft, spacecraft, watercraft, trains, boats, ships, trucks, industrial ground vehicles or automobiles, for example.

In the embodiment shown in FIG. 1, the data link communication system 110 either includes or is coupled to one or more on-vehicle communication buses 111 configured to communicate data link messages with one or more off-vehicle service provider systems 140. For example, in some embodiments, communication buses 111 establish at least one wireless communications data link 132 with an off-vehicle service provider network 130 that is communicatively coupled to the off-vehicle service provider systems 140. The wireless communications data link 132 may be established by one or more radio transceivers and antennas (shown at 113) onboard the vehicle, such as a VHF Data Radio (VDR), a SATCOM Data Unit (SDU), and/or a HF Data Radio (HFDR), for example. The data link communication system 110 also includes or is coupled to one or more on-vehicle data buses 112. The data buses 112 are configured to transport data between the data link communication system 110 and the on-vehicle systems 120, and also between the on-vehicle systems 120.

In the case where the data link communication system 110 is implemented within the context of an aircraft, the data link communication system 110 may comprise an communications management unit (CMU) or communications management function (CMF), or an Air Traffic Services Unit (ATSU) avionics computer of the aircraft. In such an embodiment where the data link communication system 110 is implemented on an avionics computer on-board an aircraft, the communication buses 112 may comprise or be coupled to one or more ARINC Standard 618 communications interfaces (such as the one or more radio transceivers 113), or other buses, configured to communicate Aircraft Communications, Addressing and Reporting System (ACARS) uplink and downlink messages with Data Link Communications System 142. These ACARS messages may comprise communications exchanges with ground service providers including, but not limited to, Air Traffic Control (ATC), Airline Operations Communications (AOC), Airline Administrative Control (AAC) or other operations or maintenance centers. The on-vehicle systems or devices 120 may comprise other avionics devices. For example, the on-vehicle computing systems 1 and 2 (shown at 122 and 124) may comprise respective first and second flight management computers (FMCs), the on-vehicle wireless computing device 126 may comprise a portable avionics computer such as an electronic flight bag (EFB), and the other on-vehicle devices 128 may comprise a cabin terminal, Multi-Function Control and Display Unit (MCDU), maintenance system, central main computer, aircraft condition monitoring system, or any other line-replicable unit (LRU) avionics or sensor devices. The data buses 112 may comprise an interface that communicates via the ARINC standard 619 over a ARINC standard 429 bus. In an aircraft implementation, the Data Link Communications System Application(s) 115 executed on the Data Link Communications System 110 may include data link applications such as, but not limited to, the AOC (Airline Operations Communications) application and the ARINC 623 Air Traffic Services (ATS) application. These are both datalink applications that can send and receive datalink messages similar to any of the on-vehicle systems or devices 120, but since the applications 115 are hosted by the Data Link Communications System 110 itself, there is no need for the applications 115 to send or receive from a data bus 112 using A619.

As shown in FIG. 1, the Data Link Communications System 110 includes a data link communications router 114, a routing control logic 116 and a conditional logic database 118. In operation, the data link communications router 114 is coupled to the communication bus(es) 111 and the data bus(es) 112 and is configured to monitor data communicated over the communication bus 111 and data buses 112. As mentioned above, the term "data" as used herein is intended to include any form of information such as, but not limited to, messages, uplink message communications, sensor or other data bus parameters, data broadcasts, A619 LRU messages, or any other form of information that might be routed through, broadcast to, or in any way received by the data link communication system 110.

In some embodiments, the routing control logic 116 is a component of one or more of the data link communications system applications 115. For example, the routing control logic 116 may be executed as part of the AOC application for an aircraft implementation. The routing control logic 116 comprises the application that functions in conjunction with the conditional logic database 118 to implement the data forwarding commands described herein. In some embodiments, the functions executed by the routing control logic 116 are at least in part obtained from the conditional logic database 118 in one or more data forwarding commands defined within the conditional logic database 118. In avionics embodiments, the conditional logic database 118 may comprise the on-board AOC database. In particular, routing control logic 116 utilizes the conditional logic database 118 to determine how data obtained by the data link communication system 110 (such as data it observes from the communication bus 111 and data bus 112, or as generated by the data link communications system applications 115) should be processed and/or forwarded to the on-vehicle systems 120 (including to applications 115).

The routing control logic 116 can determine the datatype of the data obtained by the data link communication system 110 in various ways. In some embodiments, an indication of the datatype is provided by a packet carrying the data, or within the data itself. For example, an uplink message received from the off-vehicle data link communication system 142 may include a message identifier that the routing control logic 116 can read. The routing control logic 116 may then query the on-vehicle conditional logic database 118 with the message identifier to determine how the uplink message should be handled. For example, the on-vehicle conditional logic database 118 may respond to the routing control logic 116 with one or more particular data forwarding commands that dictate how the data in the uplink message associated with the message identifier should be forwarded to one or more of the on-vehicle systems 120. The on-vehicle conditional logic database 118 may respond by providing the routing control logic 116 with logic to execute to parse one or more distinct data elements from the payload of the uplink message (as discussed in greater detail below), and provide data forwarding commands that dictate how each of those distinct data element in the uplink message associated with the message identifier should be forwarded to the one or more of the on-vehicle system 120. The on-vehicle conditional logic database 118 may respond by providing the routing control logic 116 with instructions for processing the data (or one or more distinct data elements within the data) prior to forwarded the data to one or more of the on-vehicle systems 120.

In other embodiments, the routing control logic 116 looks at other parameters from the data. For example, the on-vehicle conditional logic database 118 may define a rule that whenever an uplink message is received addressed to the on-vehicle computing system 1 (122), it is always to be also forwarded to the on-vehicle computing system 2 (124) and an on-vehicle wireless computing device 126. In some embodiments, the routing control logic 116 may perform deep packet inspection, or packet sniffing, that inspects in detail the data received at the data link communications router, whether that data is received via an uplink message, broadcast data received by the data link communication system 110, or is being communicated in another format. The deep packet inspection determines the type of data, and the routing control logic 116 may then query the on-vehicle conditional logic database 118 with the determine datatype to determine how the corresponding data should be handled (e.g. parsed, processes and/or forwarded) in the same manner discussed above and the on-vehicle conditional logic database 118 will execute the logic to respond accordingly.

In this way, the routing control logic 116 monitors and utilizes data obtained by the data link communication system 110 (e.g., from uplink messages and other data), applies logic appropriate for that data, and execute a data forwarding command defined by the conditional logic database 118. An example data forwarding command executed by the routing control logic 116 may take the form:

Onboard (Data, Destination)

where Data is the data to be forward, and Destination is the on-vehicle system 120 or application 115 designated to receive the Data. In some instances, the Data to be forwarded to the designated on-board Destination is the same initial data received by the system 110. In some instances, the routing control logic 116 may first apply filters or otherwise process the initial data received by the system 110 and the Data forwarded to the Destination would comprise the results of that processing. For example, the routing control logic 116 may first send the initial data to one or more of the applications 115 hosted on the data link communications system 110 to obtain processed Data that will be forwarded to the Destination. Whether processing of the initial data is performed to obtain the Data forwarded by the data forwarding command, or not, may be determined utilizing the logic defined in the conditional logic database 118. One distinct advantage of the approach to data routing described herein is that the rules applied to forward data are maintained in a reconfigurable database (i.e., conditional logic database 118) so that the behaviors applied by the routing control logic 116 may be revised by updating definitions stored with the conditional logic database 118 rather than having to perform device firmware or application software updates to the data link communications system 110. Within the context of aircraft implementations, this means that system or equipment recertifications otherwise required for hardware and software updates by regional aviation authorities, with their associated expenses, may be avoided.

Figure 2:
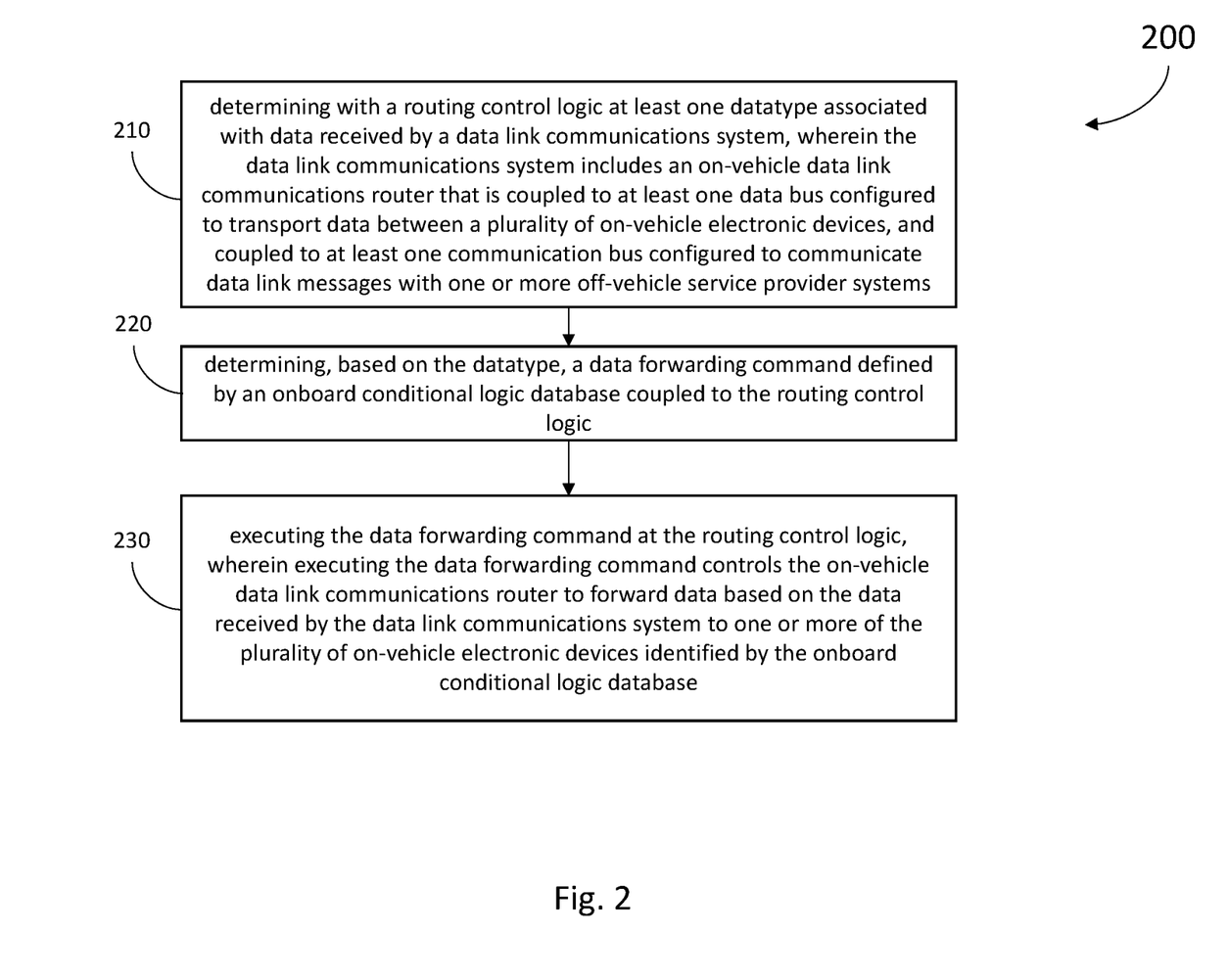
FIG. 2 is a flow chart illustrating an example method embodiment.

FIG. 2 is a flow chart illustrating a method 200 of one embodiment of the present disclosure that may be executed by or otherwise used in conjunction with the data link communications system 110 described herein. It should be understood that the features and elements described herein with respect to the method 200 shown in FIG. 2 and the accompanying description may be used in conjunction with, in combination with, or substituted for elements of any of the other embodiments discussed with respect to the other figures, or elsewhere herein, and vice versa. Further, it should be understood that the functions, structures and other description of elements associated with embodiments of FIG. 2 may apply to like named or described elements for any of the other figures and embodiments and vice versa.

The method 200 begins at 210 with determining with routing control logic at least one datatype associated with data received by a data link communications system. For example, the data may be received by an on-vehicle data link communications router, wherein the on-vehicle data link communications router is coupled to at least one data bus configured to transport data between a plurality of on-vehicle systems, and coupled to at least one communication bus configured to communicate data link messages with one or more off-vehicle service provider systems. In one embodiment, the on-vehicle systems may comprise any of the on-vehicle systems 120, including the on-vehicle computing systems 122, 124, on-vehicle wireless computing devices 128 or other on-vehicle devices 128. It should be understood that on-vehicle systems 120 may include that data link communicants system 110 that hosts the routing control logic. It should also be understood that the term "data" as used herein may include any form of uplink messages or other communications, sensor or other parameter data, or any other form of information that might be obtained by the data link communication system 110 as discussed above.

The 200 method proceeds to 220 with determining, based on the datatype, a data forwarding command defined by an onboard conditional logic database coupled to the routing control logic. An example data forwarding command may be defined as Onboard (Data, Destination) where Data is the content to be forward by the on-vehicle data link communications router and Destination is the on-vehicle system indicated by the onboard conditional logic database to receive the Data. In some embodiments, the Destination may indicate that the Data is to be forward to an application 115 hosted by the data link communication system 110. The data forwarding command may also define the format to be used for transmitting the Data as discussed further below.

The 200 method proceeds to 230 with executing the data forwarding command at the routing control logic, wherein executing the data forwarding command controls the on-vehicle data link communications router to forward data based on the data received by the data link communication system to one or more of the plurality of on-vehicle systems identified by the onboard conditional logic database.

Figure 3:
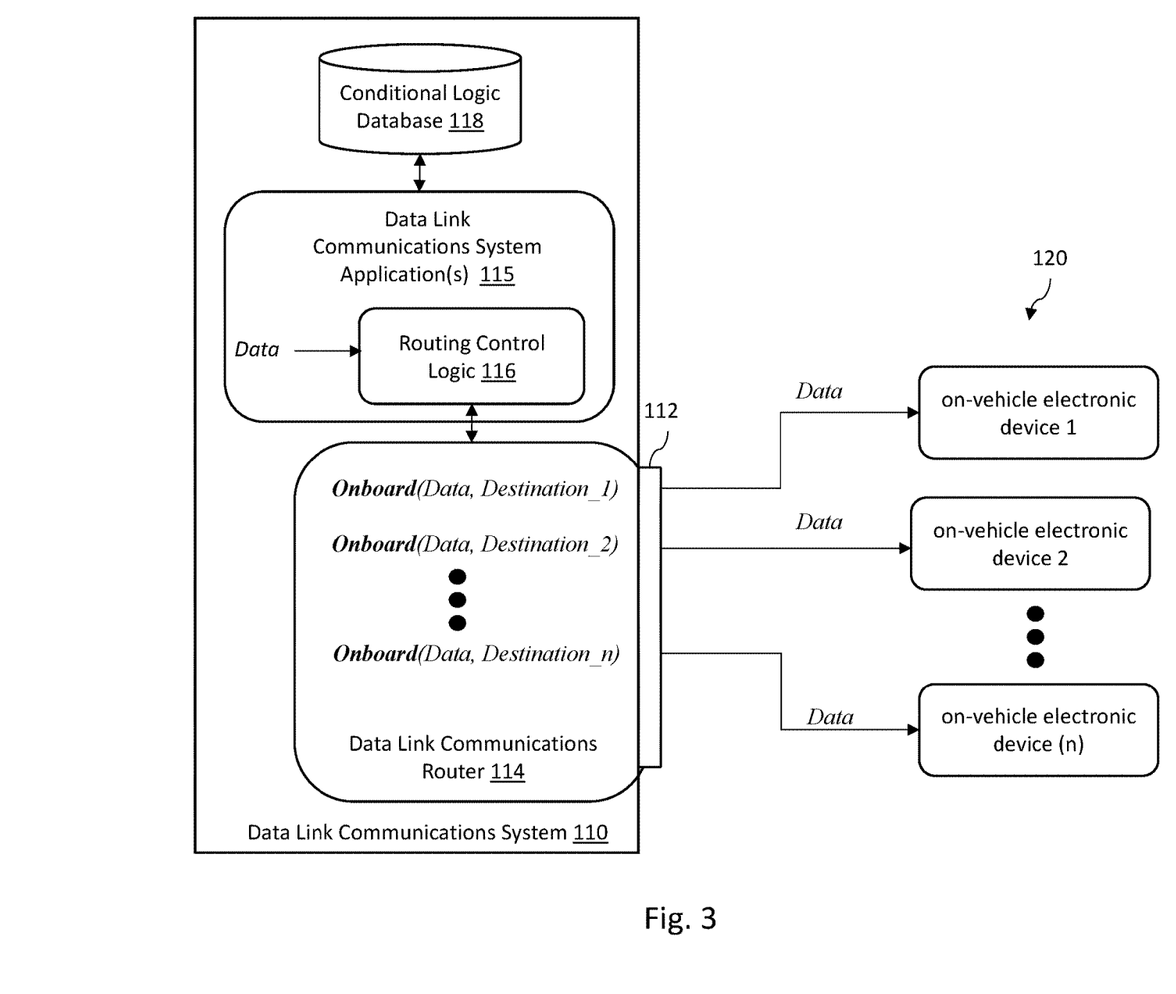
FIGS. 3, 3A and 3B are diagrams illustrating example data forwarding on-vehicle data operations for a data link communication system embodiment.

This process is further illustrated in FIG. 3 where a first set of data (shown as "Data" in FIG. 3) is received at the data link communications system 110 and the routing control logic 116 detects the datatype for the data. As discussed above, the first set of data may be any form of data received or otherwise observed at the data link communications system 110 and may come from any of the communications bus 111, data bus 112, or data link communications system applications 115, for example. The routing control logic 116 queries the conditional logic database 118 (based on the identified datatype) and in response obtains an indication of one or more on-vehicle systems that should receive the Data and executes an instance of the data forwarding command for each one or more on-vehicle systems 120. Execution of the data forwarding command causes the data link communications router 114 to output a second set of data (which may include the initial Data and/or other information) to the indicated on-vehicle systems 120. In some embodiments, the data link communications router 114 may queue a series of the output messages produced from the data forwarding commands and sequentially forward those output messages carrying the second set of data to the designated destinations. In some embodiments, where the Destination indicates that the second set of data is to be forward to an application 115 resident on the data link communications system 110, the second set of data may be sent directly to the designated application 115 rather than transmitted on the data bus 112.

Figure 3A:
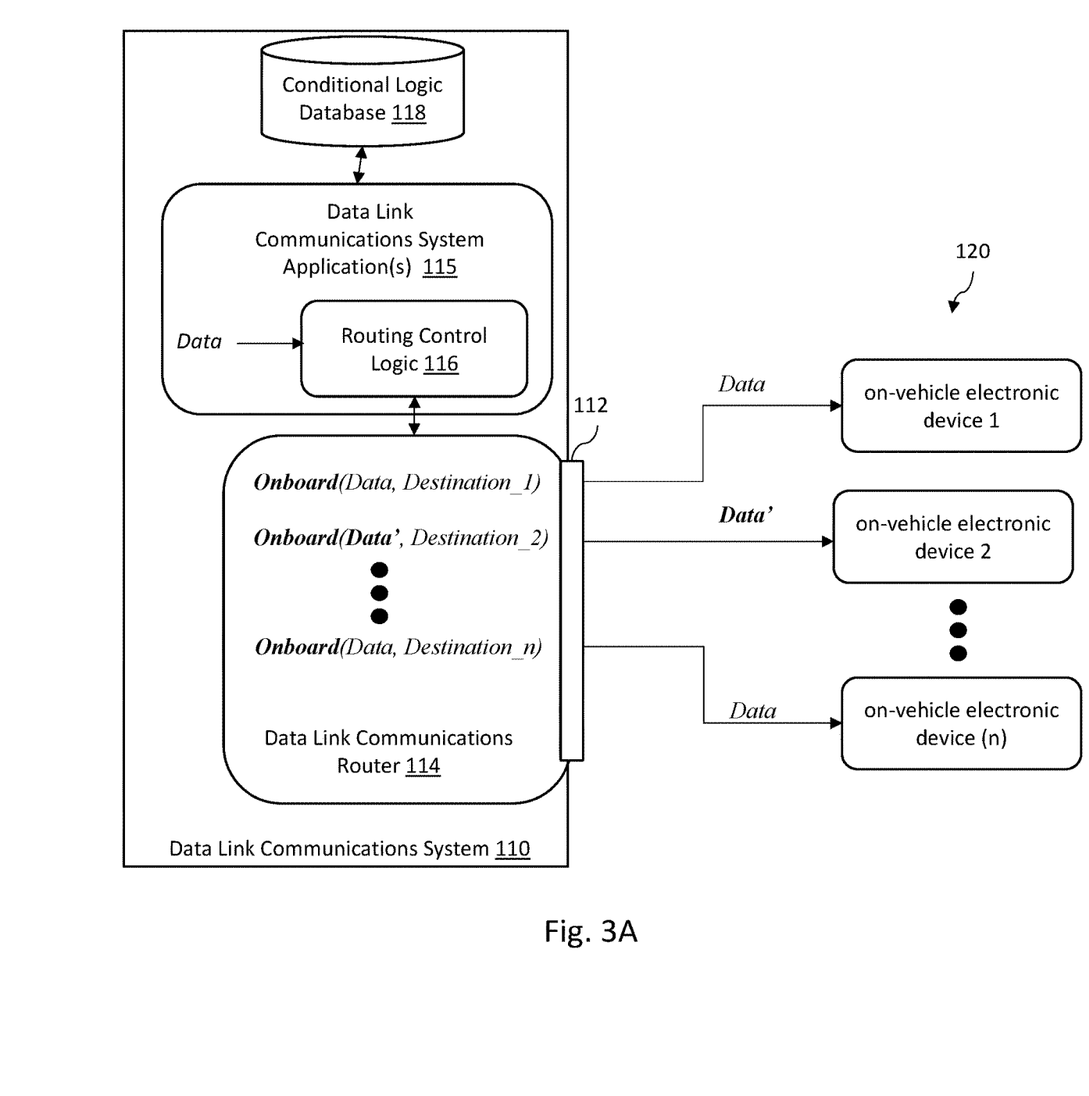

The embodiment shown in FIG. 3A is the same as shown for FIG. 3, except that the conditional logic database 118 may indicate that processing is to be applied to the received first set Data to produce a second set of data (Data') to be send to at least one of the on-vehicle systems 120. For example, one or more of the data link communications system applications 115 may be executed to process the first set of data into processed data (shown in FIG. 3B as Data'). This second set of data (Data') that is forwarded may include the initial Data, but may instead or also include data augmented or altered based on additional data from other sources. The additional data may, for example, be received from the data link communications system applications 115 or any of the on-vehicle systems 120, uplink messages, data derived from the original data and/or from other sources.

In the particular example illustrated in FIG. 3A, the data forwarding command is executed once to send the received (i.e., unprocessed) Data to a first of the on-vehicle system 120 (at Destination_1), and executed again to send the processed Data' to a second of the on-vehicle system 120 (at Destination_2). In some embodiments, the processing applied to the received data may comprise incrementing values, filtering data, appending additional data or otherwise augmenting the first set of data received at the router 114. In some embodiments, the routing control logic 116 may execute individual instances of the data forwarding command for each of the respective on-vehicle systems 120 designated as a destination.

Figure 3B:
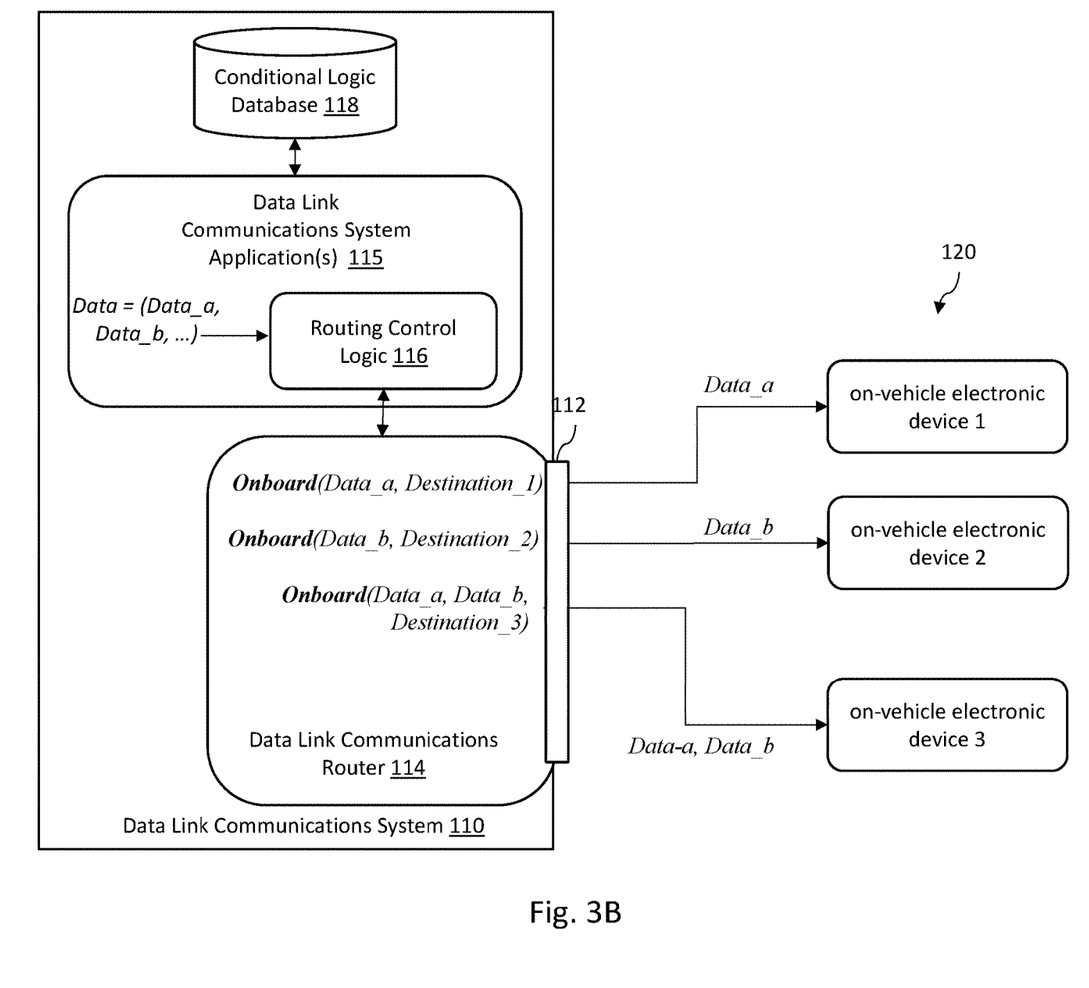

The embodiment shown in FIG. 3A is the same as shown for FIG. 3, except that the first set of Data received at the data link communications system 110 includes a plurality of distinct data elements (shown as Data_a, Data_b in FIG. 3B). For example, the Data as received may comprise an uplink message from the off-vehicle data link communications system 142 that include multiple distinct message fields each transporting their own data elements. In this embodiment, routing control logic 116 parses the Data as received at the data link communications system 110 into the distinct data elements and queries the conditional logic database 118 (based on identified datatypes, for example) for each of the distinct data elements.

For example, the conditional logic database 118 may indicate that a first of the on-vehicle systems 120 that should receive a first data element, Data_a, a second of the on-vehicle systems 120 that should receive a second data element, Data_b, and a third of the on-vehicle systems 120 that should receive both the first data element, Data_a, and the second data element, Data_b. Routing control logic 116 executes an instance of the data forwarding command for each of the respective on-vehicle systems 120 to instruct the data link communications router 114 to forward the indicated data elements to the on-vehicle systems 120 specified by the conditional logic database 118. It should be understood that the operation described in FIG. 3B may be used in combination with the operations described in FIGS. 3 and 3A. That is, the conditional logic database 118 may direct the routing control logic 116 to apply a process to one or more of the received data elements (Data_a, Data_b) before forwarding that data element to a designated on-vehicle systems 120.

Figure 4:
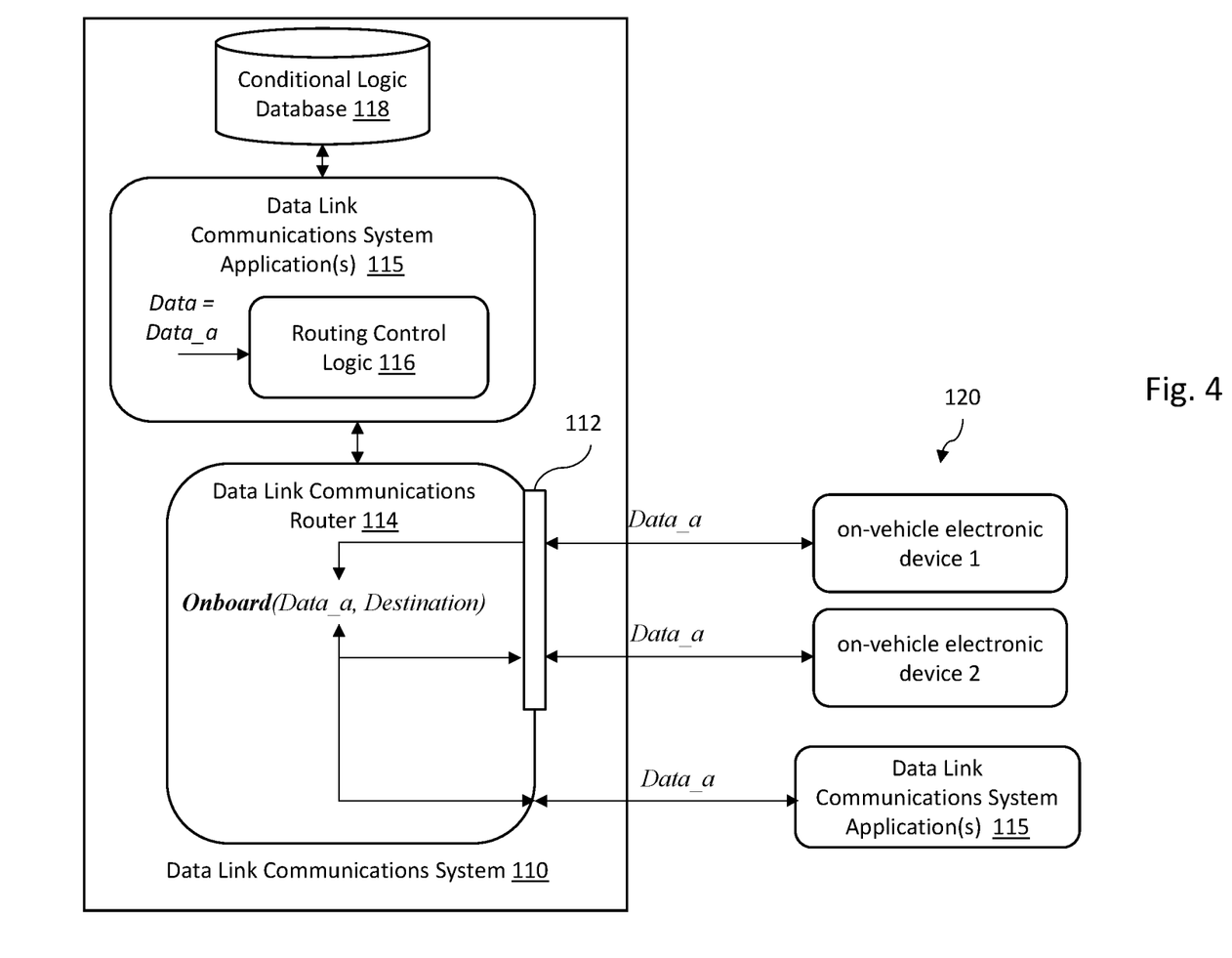
FIG. 4 is a diagram illustrating example a data synchronization operation for a data link communication system embodiment.

FIG. 4 illustrates another aspect of the present disclosure where the conditional logic database 118 defined data forwarding command may be utilized to automatically and dynamically synchronize data between on-vehicle systems 120 and/or data link communications system hosted application(s) 115. For example, a first on-vehicle system 120 may broadcast or otherwise transmit Data_a onto a data base 112. The routing control logic 116 will detect the data and its datatype, query the conditional logic database 118 and execute the database 118 defined data forwarding command to instruct the data link communications router 114 to forward that Data_a either to another on-vehicle system 120 or a data link system hosted application(s) 115 may communicate Data_a to the data link communications router 114, The routing control logic 116 will detect the data and its datatype, query the conditional logic database 118 and execute the database 118 defined data forwarding command to instruct the data link communications router 114 to forward that Data_a to one or more of the on-vehicle system 120. In this way, neither the on-vehicle systems 120 nor the data link communications system hosted applications 115 need to be programed with a specific synchronization function to achieve data synchronization. Instead, the definitions stored in the conditional logic database 118 may instead be established by the vehicle operator to establish what data needs to be synchronized with what on-vehicle system 120, and the logic of those definitions readily revised and updated by the vehicle operator merely by updating the on-board database 118. For example, within the context of an aircraft context, data from an AOC application hosted on a CMU may be synchronized with AOC applications executed on an EFB without either the AOC application on the CMU or AOC applications executed on an EFB being specifically programmed to do so.

In each of the embodiments described above, the format of the messages generated by the data forwarding command may be defined conditional logic database 118 so that the forwarded data is communicated in a format compatible with the indented destination on-vehicle system 120. For example, the conditional logic database 118 may define formatting forwarded data using one of an ARINC 619 message format, ARINC 429 data transfer standard, Avionics Full Duplex Switched Ethernet (AFDX) message format, or another Ethernet message format. The conditional logic database 118 may also define how to present to the vehicle operators (e.g. the flight crew) any messages or data forwarded to on-vehicle system 120 that comprise human-machine interfaces or display devices. In some embodiments, the data forwarded to an on-vehicle system 120 that comprises a human-machine interface may take the form of a pre-formatted request for a downlink message, which if approved by the vehicle operator will be transmitted from the vehicle in a downlink message to the data link communications system 142.

In some embodiments, the functionality provided by the combination of the routing control logic 116 and conditional logic database 118 may be utilized to trigger transmissions of messages to any of the on-vehicle system 120 based on the detection of an event occurrence. For example, an on-vehicle system 120 may transmit to the data bus 112 that an event has occurred. The on-vehicle system 120 may transmit data indicating a current time and/or vehicle position or the occurrence of OOOI events (where OOOI is a standard term used in the aviation industry relevant to aircraft "out of the gate, off the ground, on the ground, and into the gate" events). For example, in the context of an aircraft, and on-vehicle system 120 may transmit operational data indicating that the aircraft has transitioned from one flight stage to another, or that landing-gear has been deployed or retracted. As another example, the routing control logic 116 may detect from monitoring of the communication bus 111 that the data link communications system 110 is transmitting from the datalink communications router 114 a downlink message to the off-vehicle data link communications system 142. Regardless of it source, the routing control logic 116 may identify the particular data received at the data link communications router, and from querying the conditional logic database 118 execute a data forwarding command to send messages to one or more of the other on-vehicle system 120.

As mentioned above, efficiencies in the utilization of wireless bandwidth may be realized using one or more of the embodiments described herein because an off-vehicle data link communication system 142 need only send a particular set of data to the vehicle once, and rely on the on-vehicle routing control logic 116 and conditional logic database 118 to distribute that set of data to the on-vehicle systems 120. In some embodiments, the off-vehicle data link communication system 142 may comprise records or have access to databases that identify which vehicles are equipped with the on-vehicle routing control logic 116 and conditional logic database 118 functionalities described herein (for example, by a vehicle identification number such as an aircraft tail number) so that it may adjust the format it uses to send uplink messages according to the capabilities of the vehicle that will receive the uplink messages.

EXAMPLE EMBODIMENTS

Example 1 includes a data link communication system for a vehicle, the system comprising: a data link communications router configured to communicate with at least one on-vehicle communication bus and at least one on-vehicle data bus, and monitor data communicated over the at least one on-vehicle communication bus and the at least one on-vehicle data bus, wherein the at least one communication bus communicates data link messages with at least one off-vehicle service provider system, wherein the at least one on-vehicle data bus transports data between the data link communications router and a plurality of on-vehicle systems; a routing control logic; and a conditional logic database coupled to the routing control logic, wherein the conditional logic database comprises definitions which include definitions of one or more datatypes and definitions for at least one data forwarding command utilized by the routing control logic to forward data to the plurality of on-vehicle systems; wherein, in response to the data link communications system receiving a first set of data associated with a datatype defined by the conditional logic database, the routing control logic executes the at least one data forwarding command to control the data link communications router to output a second set of data to one or more of the plurality of on-vehicle systems.

Example 2 includes the system of example 1, wherein the second set of data is based at least in part from the first set of data.

Example 3 includes the system of any of examples 1-2, wherein the first set of data is one of: an uplink message received by the data link communications system from the at least one off-vehicle service provider systems via the at least one on-vehicle communication bus; data from a first on-vehicle system of the plurality of on-vehicle systems received by the data link communications system via the at least one on-vehicle data bus; or data from a data link communications system application executed by the data link communications system.

Example 4 includes the system of any of examples 1-3, wherein the routing control logic parses the first set of data to identify distinct data elements from the first set of data; and wherein the routing control logic executes a first data forwarding command defined by the conditional logic database to instruct the data link communications router to output a first of the distinct data elements to a first of the plurality of on-vehicle systems; wherein the routing control logic executes a second data forwarding command defined by the conditional logic database to instruct the data link communications router to output a second of the distinct data elements to a second of the plurality of on-vehicle systems different from the first of the plurality of on-vehicle systems.

Example 5 includes the system of any of examples 1-4, wherein the routing control logic executes a process to generate at least part of the second set of data in response to receiving the first set of data.

Example 6 includes the system of example 5, wherein the process comprises an application hosted on the data link communication system.

Example 7 includes the system of any of examples 1-6, wherein the second set of data is output to an application hosted on the data link communication system.

Example 8 includes the system of any of examples 1-7, wherein the at least one data forwarding command is defined in terms of a first parameter that indicates a content of the second set of data and a second parameter that indicates a destination that identifies which of the plurality of on-vehicle systems will receive the second set of data indicated by the first parameter.

Example 9 includes the system of any of examples 1-8, wherein the routing control logic performs deep packet inspection on the first set of data to determine a first datatype of the first set of data and executes the at least one data forwarding command based on the first datatype.

Example 10 includes the system of any of examples 1-9, wherein the routing control logic reads a message identifier from the first set of data to determine a first datatype of the first set of data and executes the at least one data forwarding command based on the first datatype.

Example 11 includes the system of any of examples 1-10, wherein the routing control logic executes a data forwarding command defined by the conditional logic database to synchronize a first of the plurality of on-vehicle systems with a second of the plurality of on-vehicle systems.

Example 12 includes the system of any of examples 1-11, wherein the routing control logic triggers transmissions of a message to at least one of the plurality of on-vehicle systems based on detection of an event occurrence as indicated by the first set of data.

Example 13 includes the system of any of examples 1-12, wherein the routing control logic formats the second set of data based on a format defined by the conditional logic database.

Example 14 includes the system of any of examples 1-13, wherein the vehicle comprises one of an aircraft, spacecraft, watercraft, train, truck, or automobile.

Example 15 includes the system of any of examples 1-14, wherein the definitions of one or more datatypes and definitions for at least one data forwarding command in the conditional logic database are reconfigurable.

Example 16 includes a method for a data link communication system for a vehicle, the method comprising: determining with a routing control logic at least one datatype associated with a first set of data received at an on-vehicle data link communications router, wherein the on-vehicle data link communications router is coupled to at least one data bus configured to transport data between a plurality of on-vehicle systems, and coupled to at least one communication bus configured to communicate data link messages with one or more off-vehicle service provider systems; determining, based on the datatype, a data forwarding command defined by an onboard conditional logic database coupled to the routing control logic; and executing the data forwarding command at the routing control logic, wherein executing the data forwarding command controls the on-vehicle data link communications router to output a second set of data based on the first set of data to one or more of the plurality of on-vehicle systems identified by the onboard conditional logic database.

Example 17 includes the method of example 16, wherein the first set of data is one of: an uplink message received by the data link communications system from the at least one off-vehicle service provider systems via the at least one communications bus; data from a first on-vehicle system of the plurality of on-vehicle systems received by the data link communications system via the at least one on-vehicle data bus; or data from a data link communications system application executed by the data link communications system.

Example 18 includes the method of any of examples 16-17, wherein the routing control logic executes a process applied to the first set of data to generate at least part of the second set of data.

Example 19 includes the method of any of examples 16-18, wherein the routing control logic formats the second set of data based on a format defined by the conditional logic database.

Example 20 includes the method of any of examples 16-19, wherein the routing control logic parses the first set of data to identify distinct data elements from the first set of data; and wherein the routing control logic executes a first data forwarding command defined by the conditional logic database to instruct the data link communications router to output a first of the distinct data elements to a first of the plurality of on-vehicle systems; wherein the routing control logic executes a second data forwarding command defined by the conditional logic database to instruct the data link communications router to output a second of the distinct data elements to a second of the plurality of on-vehicle systems different from the first of the plurality of on-vehicle systems.

In various alternative embodiments, system and/or device elements, method steps, or example implementations described throughout this disclosure (such as any of the Data Link Communication System, Routing Control Logic, Data Link Communications Router, Conditional Logic Database, Data Link Communications System Applications, on-vehicle devices, or any controllers, circuits, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein, terms such as "Data Link Communication System, Routing Control Logic, Data Link Communications Router, Conditional Logic Database, Data Link Communications System Applications, Communications Management Unit (CMU) or Air Traffic Services Unit (ATSU)" refer to hardware elements that would be immediately recognized and understood by those of skill in the art of avionics and other transportation industries and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A data link communication system for a vehicle, the system comprising:
   a data link communications router configured to communicate with at least one on-vehicle communication bus and at least one on-vehicle data bus, and monitor data communicated over the at least one on-vehicle communication bus and the at least one on-vehicle data bus, wherein the at least one on-vehicle communication bus is configured to communicate data link messages with at least one off-vehicle service provider system, wherein the at least one on-vehicle data bus is configured to transport data between the data link communications router and a plurality of on-vehicle systems;
a routing control logic; and
a conditional logic database coupled to the routing control logic, wherein the conditional logic database comprises definitions which include definitions of one or more datatypes and definitions for at least one data forwarding command utilized by the routing control logic to forward data to the plurality of on-vehicle systems;
wherein, in response to the data link communication system receiving a first set of data associated with a datatype defined by the conditional logic database, the routing control logic is configured to execute the at least one data forwarding command to control the data link communications router to output a second set of data to more than one of the plurality of on-vehicle systems;
wherein the first set of data is an uplink message received by the data link communication system from the at least one off-vehicle service provider system via the at least one on-vehicle communication bus;
wherein the second set of data is based at least in part from the first set of data.

2. The system of claim 1, wherein the routing control logic parses the first set of data to identify distinct data elements from the first set of data; and
wherein the routing control logic is configured to execute a first data forwarding command defined by the conditional logic database to instruct the data link communications router to output a first of the distinct data elements to a first of the plurality of on-vehicle systems;
wherein the routing control logic is configured to execute a second data forwarding command defined by the conditional logic database to instruct the data link communications router to output a second of the distinct data elements to a second of the plurality of on-vehicle systems different from the first of the plurality of on-vehicle systems.

3. The system of claim 1, wherein the routing control logic executes a process to generate at least part of the second set of data in response to receiving the first set of data.

4. The system of claim 3, wherein the process comprises an application hosted on the data link communication system.

5. The system of claim 1, wherein the second set of data is output to an application hosted on the data link communication system.

6. The system of claim 1, wherein the at least one data forwarding command is defined in terms of a first parameter that indicates a content of the second set of data and a second parameter that indicates a destination that identifies which of the plurality of on-vehicle systems will receive the second set of data indicated by the first parameter.

7. The system of claim 1, wherein the routing control logic is configured to perform deep packet inspection on the first set of data to determine a first datatype of the first set of data and executes the at least one data forwarding command based on the first datatype.

8. The system of claim 1, wherein the routing control logic reads a message identifier from the first set of data to determine a first datatype of the first set of data and executes the at least one data forwarding command based on the first datatype.

9. The system of claim 1, wherein the routing control logic is configured to trigger transmissions of a message to at least one of the plurality of on-vehicle systems based on detection of an event occurrence as indicated by the first set of data.

10. The system of claim 1, wherein the routing control logic is configured to format the second set of data based on a format defined by the conditional logic database.

11. The system of claim 1, wherein the vehicle comprises one of an aircraft, spacecraft, watercraft, train, truck, or automobile.

12. The system of claim 1, wherein the definitions of one or more datatypes and definitions for at least one data forwarding command in the conditional logic database are reconfigurable.

13. A method for a data link communication system for a vehicle, the method comprising:
determining with a routing control logic at least one datatype associated with a first set of data received at an on-vehicle data link communications router, wherein the on-vehicle data link communications router is coupled to at least one data bus configured to transport data between a plurality of on-vehicle systems, and coupled to at least one on-vehicle communication bus configured to communicate data link messages with one or more off-vehicle service provider systems;
determining, based on the at least one datatype, a data forwarding command defined by an onboard conditional logic database coupled to the routing control logic; and
executing the data forwarding command at the routing control logic, wherein executing the data forwarding command controls the on-vehicle data link communications router to output a second set of data based on the first set of data to more than one of the plurality of on-vehicle systems identified by the onboard conditional logic databases;
wherein the first set of data is an uplink message received by the data link communication system from the one or more off-vehicle service provider systems via the at least one on-vehicle communication bus;
wherein the second set of data is based at least in part from the first set of data.

14. The method of claim 13, further comprising executing, with the routing control logic, a process applied to the first set of data to generate at least part of the second set of data.

15. The method of claim 13, further comprising formatting, with the routing control logic, the second set of data based on a format defined by the onboard conditional logic database.

16. The method of claim 13, further comprising:
parsing, with the routing control logic, the first set of data to identify distinct data elements from the first set of data;
executing, with the routing control logic, a first data forwarding command defined by the onboard conditional logic database to instruct the on-vehicle data link communications router to output a first of the distinct data elements to a first of the plurality of on-vehicle systems; and
executing, with the routing control logic, a second data forwarding command defined by the onboard conditional logic database to instruct the on-vehicle data link communications router to output a second of the distinct data elements to a second of the plurality of on-vehicle systems different from the first of the plurality of on-vehicle systems.

\* \* \* \* \*